(12) United States Patent
Jung et al.

(10) Patent No.: US 10,901,653 B2
(45) Date of Patent: Jan. 26, 2021

(54) ELECTRONIC DEVICE

(71) Applicant: SK hynix Inc., Gyeonggi-do (KR)

(72) Inventors: Seok Hoon Jung, Gyeonggi-do (KR); In Woong Heo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/201,028

(22) Filed: Nov. 27, 2018

(65) Prior Publication Data
US 2019/0324680 A1 Oct. 24, 2019

(30) Foreign Application Priority Data
Apr. 18, 2018 (KR) .......................... 10-2018-0044785

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G06F 3/064; G06F 3/0652; G06F 3/0655; G06F 3/0616; G06F 3/0604; G06F 3/0679
USPC ........................................................ 711/154
See application file for complete search history.

(56) References Cited

U.S. PATENT DOCUMENTS

2017/0286014 A1* 10/2017 Hady .................... G06F 3/0659

FOREIGN PATENT DOCUMENTS

KR 10-1739556 5/2017

* cited by examiner

*Primary Examiner* — David Yi
*Assistant Examiner* — Zubair Ahmed
(74) *Attorney, Agent, or Firm* — IP & T Group LLP

(57) ABSTRACT

An electronic device includes a controller; and a non-transitory computer-readable storage medium configured to store operation codes for causing the controller to execute processes. The non-transitory computer-readable storage medium includes a plurality of memory blocks. The processes include grouping the plurality of memory blocks into a plurality of super blocks; selecting a first super block among the plurality of super blocks depending on one or more logical addresses corresponding to write-requested data, and writing the data; and mapping the first super block to a first logical address range. The first logical address range is configured by successive addresses corresponding to a super block size, and a start address of the successive addresses is a start logical address of the one or more logical addresses.

14 Claims, 13 Drawing Sheets

ELECTRONIC DEVICE

CROSS-REFERENCES TO RELATED APPLICATION

The present application claims priority under 35 U.S.C. § 119(a) to Korean application number 10-2018-0044785, filed on Apr. 18, 2018, which is incorporated herein by reference in its entirety.

BACKGROUND

1. Technical Field

Various embodiments generally relate to an electronic device and, more particularly, to an electronic device including a nonvolatile memory device.

2. Related Art

Electronic devices may store data provided by an external device in response to a write request received from the external device. Electronic devices may also provide stored data to an external device in response to a read request received from the external device. An external device is often referred to as a host device or simply a host. Examples of external devices that use electronic devices include computers, digital cameras, cellular phones and the like. Electronic devices may be embedded in an external device during manufacturing of the external device or may be fabricated separately and then connected afterwards to an external device.

SUMMARY

In an embodiment, an electronic device includes: a controller; and a non-transitory computer-readable storage medium configured to store operation codes for causing the controller to execute processes, wherein the non-transitory computer-readable storage medium includes a plurality of memory blocks, wherein the processes include grouping the plurality of memory blocks into a plurality of super blocks; selecting a first super block among the plurality of super blocks depending on one or more write-target logical addresses corresponding to write-requested data, and writing the data; and mapping the first super block to a first logical address range, and wherein the first logical address range is configured by successive addresses corresponding to a super block size, and a start address of the successive addresses is a start logical address of the one or more write-target logical addresses.

In an embodiment, an electronic device includes: a controller; and a non-transitory computer-readable storage medium configured to store operation codes for causing the controller to execute processes, wherein the non-transitory computer-readable storage medium includes a plurality of memory blocks, and wherein the processes include grouping the plurality of memory blocks into a plurality of super blocks, and mapping first super blocks among the plurality of super blocks to logical address ranges, respectively; and comparing one or more write-target logical addresses corresponding to write-requested data with the logical address ranges, and writing the data in at least one super block among the first super blocks.

In an embodiment, a memory system includes: a memory device including a plurality of super blocks; and a controller configured to: control the memory device to write data into one among currently opened super blocks according to one or more write-target logical addresses falling within logical address ranges respectively mapped to the currently opened super blocks; and open another super block from the super blocks, map another logical address range to the another newly opened super block and control the memory device to write data into the another newly opened super block according to one or more among write-target logical addresses out of the logical address ranges respectively mapped to the currently opened super blocks, wherein the logical address range is a group of consecutive logical addresses, and wherein a start address of the another logical address range is a start address of the write-target logical addresses out of the logical address ranges respectively mapped to the currently opened super blocks.

These and other features and advantages of the present invention will become apparent to those skilled in the art of the invention from the following detailed description in conjunction with the following drawings.

DETAILED DESCRIPTION

Figure 1:
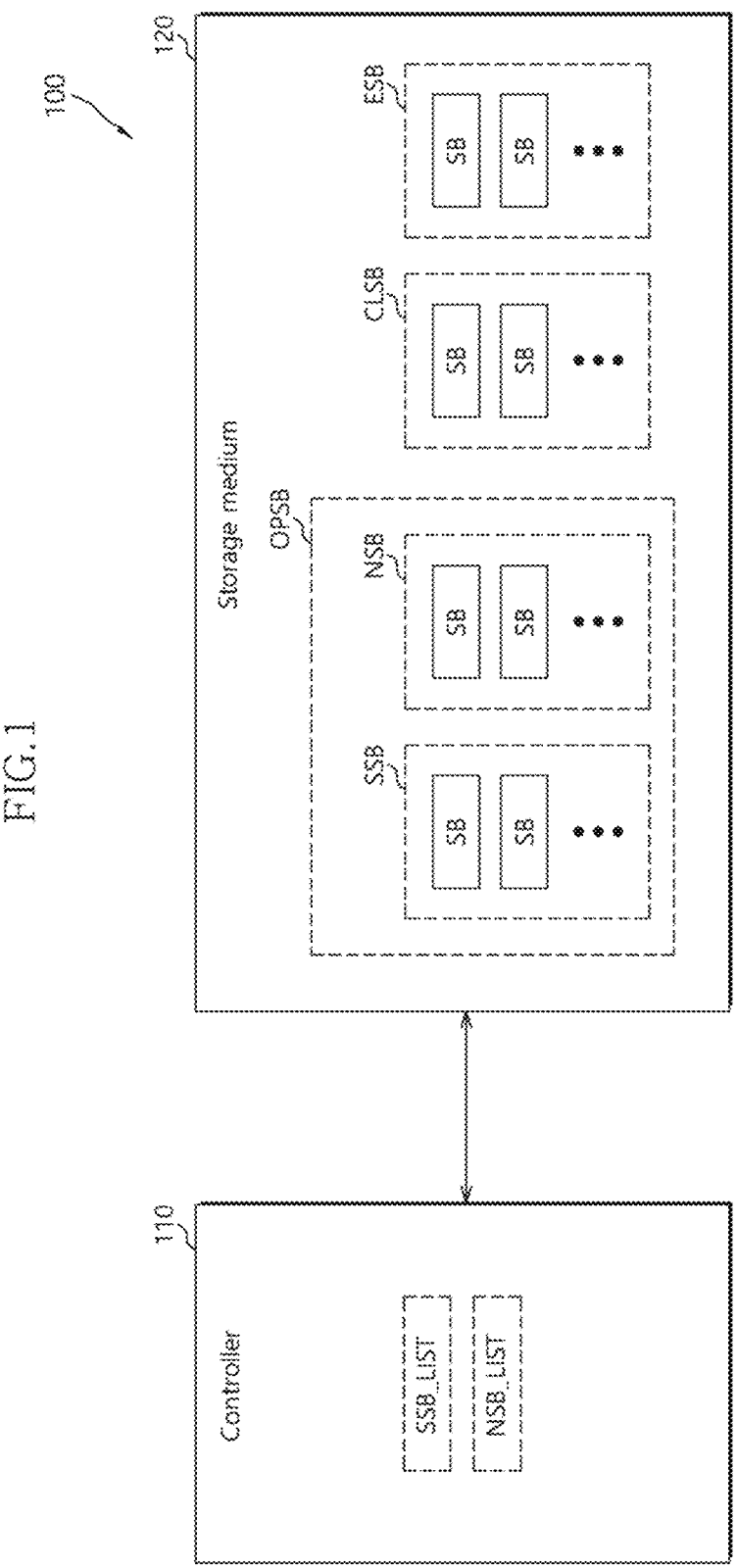
FIG. 1 is a block diagram illustrating an electronic device in accordance with an embodiment.

Hereinafter, a data storage device and an operating method thereof according to the present invention will be described with reference to the accompanying drawings through exemplary embodiments of the present invention.

The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating an electronic device 100 in accordance with an embodiment.

The electronic device 100 may be configured to store data provided from an external host device (not shown), in response to a write request of the host device. Also, the electronic device 100 may be configured to provide stored data to the host device, in response to a read request of the host device.

The electronic device 100 may be configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The host device may, for example, include a personal computer, a laptop computer, a smartphone, a tablet computer, a digital camera, a game console, a navigation, a virtual reality device, a wearable device, and the like. The electronic device 100 may be removably or permanently coupled to the host device. The electronic device 100 may be built as a component part of the host device, during the manufacturing of the host device. The electronic device 100 may be built separately and may be removably coupled to the host device.

Referring now to FIG. 1, the electronic device 100 may include a controller 110 and a storage medium 120 operatively coupled to each other.

The controller 110 may control the operation of the electronic device 100. For, example, the controller 110 may access the storage medium 120 to process a request of the host device. Also, the controller 110 may access the storage medium 120 to perform an internal management operation or a background operation of the electronic device 100. The internal management operations or background operations of the electronic device 100 may be controlled by the controller without a request from the host device.

The controller 110 may group the plurality of memory blocks (not shown) included in the storage medium 120, into a plurality of super blocks SB. A super block SB may be a logical unit of a memory region for the controller 110 to which the controller 110 performs a garbage collection operation and a wear leveling operation in the storage medium 120. Each super block SB may be formed over a plurality of nonvolatile memory devices which are included in the storage medium 120, as will be described later. A method for the controller 110 to form the super blocks SB in the storage medium 120 will be described later in detail with reference to FIG. 2.

The controller 110 may memorize and manage the super blocks SB by classifying them into opened super blocks OPSB, closed super blocks CLSB and erased super blocks ESB.

First, the controller 110 may select, that is, open, one or more super blocks SB for a write access, and may manage them as opened super blocks OPSB. Opening a super block SB means to designate an erased super block ESB as an opened super block OPSB for a write access. An opened super block OPSB may be write-accessed until it no longer includes an empty region. An opened super block OPSB may be closed when it no longer includes an empty region and may be managed as a closed super block CLSB.

That is, an opened super block OPSB, as this term is used herein, includes both a region where data is stored and an empty region where data is not stored. A closed super block CLSB, as this term is used herein, includes only a region where data is stored and does not include an empty region where data is not stored. An erased super block ESB, as this term is used herein, includes only an empty region where data is not stored.

The controller 110 may manage one or more opened super blocks OPSB as special super blocks SSB and may map a specific available logical address range for each special super block SSB. A logical address may be an address at which the host device looks and recognizes the electronic device 100.

When one or more logical addresses of write-requested data are included in a logical address range which is mapped to a certain special super block SSB, the corresponding data may be written in the corresponding special super block SSB. Conversely, when one or more logical addresses of write-requested data are not included in a logical address range which is mapped to a certain special super block SSB, the corresponding data cannot be written in the corresponding special super block SSB.

Data which can be written in each of special super blocks SSB may be limited. The logical address ranges mapped to respective special super blocks SSB may be determined as follows.

When opening a super block SB, the controller 110 may designate the corresponding super block SB as a special super block SSB and may map the special super block SSB to a specific logical address range. Namely, when opening a new special super block SSB, the controller 110 may map the new special super block SSB to a specific logical address range. A logical address range mapped to a special super block SSB may be configured by successive logical addresses corresponding to a super block size, and the start logical address of the logical address range may be the start logical address of data to be initially written in the corresponding special super block SSB.

When a write request is received from the host device, the controller 110 may determine whether write-requested data can be written in a special super block SSB which is currently opened. In detail, the controller 110 may compare one or more write-target logical addresses of the write-requested data with the logical address ranges respectively mapped to the special super blocks SSB. When the write-target logical addresses of the data are included in at least one logical address range among the logical address ranges respectively mapped to the special super blocks SSB, the data may be written in a special super block SSB which is mapped to the corresponding logical address range. However, when the write-target logical addresses of data are not included in even at least one among the logical address ranges respectively mapped to the special super blocks SSB, the controller 110 may open a new special super block SSB to write the data under a certain condition as will be described later. In this case, as described above, a logical address range mapped to the new special super block SSB may be configured by successive logical addresses corresponding to a super block size, and the start logical address of the logical address range may be the start logical address of data to be initially written in the new special super block SSB.

In order to open a new special super block SSB, the controller 110 may further determine whether the number of special super blocks SSB, which are currently opened, is less than a reference number. When write-requested data cannot be written in special super blocks SSB which are currently opened, if the number of the special super blocks SSB which are currently opened is less than the reference number, the controller 110 may open a new special super block SSB.

However, when the number of special super blocks SSB which are currently opened is equal to the reference number, the controller 110 may not additionally open a special super block. This way, at any given time, the maximum number of special super blocks SSB cannot exceed the reference number. This controls the maximum number of special super blocks SSB which are used simultaneously in the storage medium 120.

When the number of special super blocks has reached the reference number and the logical addresses of data received by the host do not correspond to any range allocated to one of the special super blocks, the controller may control the writing of these data to normal super blocks NSB. More specifically, the controller 110 may manage one or more opened super blocks OPSB as normal super blocks NSB. Normal super blocks NSB are super blocks designated for writing data which cannot be written in currently opened special super blocks SSB or a new special super block SSB. Normal super blocks NSB are super blocks which are not mapped to logical address ranges when they are opened. The controller 110 may retain a predetermined number of normal super blocks NSB. If a certain normal super block NSB is closed, the controller 110 may open a new super block SB and designate the corresponding super block SB as a normal super block NSB. This way the controller maintains the number of normal super blocks to a predetermined number.

Thus write-requested data may be written preferentially into a special super block SSB. However, when a special super block SSB is not available for write-requested data then the write-requested data may be written into a normal super block NSB.

The controller 110 may generate and manage a special super block list SSB_LIST and a normal super block list NSB_LIST. The special super block list SSB_LIST may include information on special super blocks SSB and information on the logical address range mapped to each of the special super blocks SSB. The information on the special super blocks SSB may include block addresses of memory blocks grouped into the special super blocks SSB. The normal super block list NSB_LIST may include information on the normal super blocks NSB. The information on the normal super blocks NSB may include block addresses of memory blocks grouped into the normal super blocks NSB. By first checking the special super block list SSB_LIST and then if needed the normal super block list NSB_LIST, the controller 110 may select a super block to store write-requested data according to the above-described method.

According to an embodiment, when a reference time elapses from when a special super block SSB is opened, the controller 110 may close the corresponding special super block SSB even when the special super block SSB is not full of data yet.

The storage medium 120 may store data transmitted from the controller 110 and may read stored data and transmit read data to the controller 110, according to the control of the controller 110. The storage medium 120 may be accessed by being grouped into super blocks SB by the controller 110 as will be described in more detail below with reference to FIG. 2.

Figure 2:
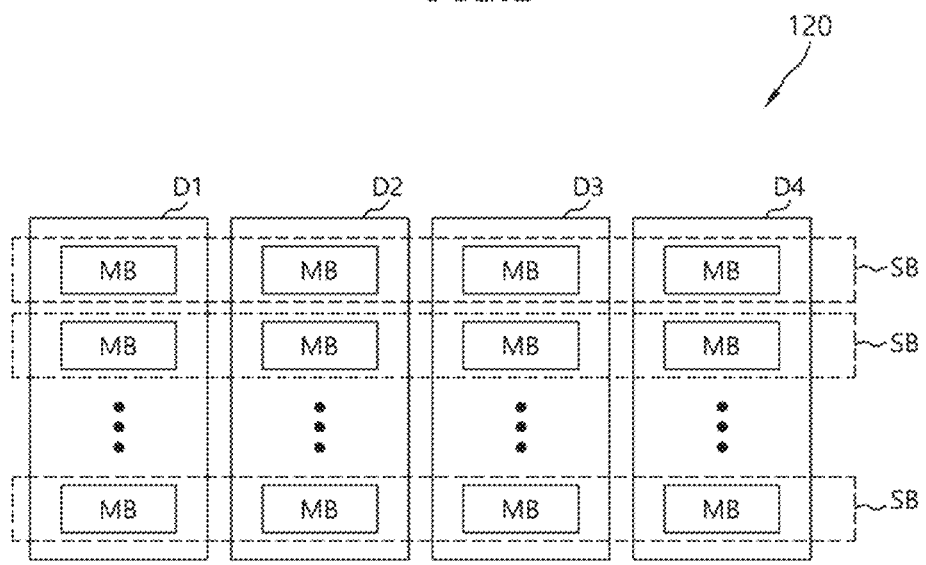
FIG. 2 is a diagram illustrating a method for the controller to group memory blocks into super blocks.

FIG. 2 is a schematic diagram illustrating a method for the controller 110 of FIG. 1 to group memory blocks MB into super blocks SB.

Referring to FIG. 2, the storage medium 120 may include nonvolatile memory devices D1 to D4. Each of the nonvolatile memory devices D1 to D4 may include a plurality of memory blocks MB. Each memory block MB may include memory cells which are erasable together. In other words, a memory block MB may be the unit by which a nonvolatile memory device performs an erase operation.

The controller 110 may group the memory blocks MB included in the nonvolatile memory devices D1 to D4, into super blocks SB. Each super block SB may be formed over the nonvolatile memory devices D1 to D4. Memory blocks MB grouped into each super block SB may be evenly distributed over the nonvolatile memory devices D1 to D4. Memory blocks MB grouped into each super block SB may be included in the nonvolatile memory devices D1 to D4, respectively. For, example, each super block SB may include at least one memory block MB from each memory device D1 to D4.

While it is illustrated in FIG. 2 that one memory block MB in one nonvolatile memory device is included in each super block SB, it is to be noted that, according to an embodiment, the number of memory blocks MB included in each super block SB in one nonvolatile memory device may be at least two.

A super block SB may be a unit for the controller 110 to access the nonvolatile memory devices D1 to D4 in parallel. Namely, since a super block SB is formed over the nonvolatile memory devices D1 to D4, the controller 110 may access the nonvolatile memory devices D1 to D4 in parallel. In order to store data in the storage medium 120, by accessing the nonvolatile memory devices D1 to D4 in parallel, the controller 110 may divisionally write data in the memory blocks MB of an opened super block SB.

A nonvolatile memory device may be any suitable nonvolatile memory device including a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 2 that the storage medium 120 includes four nonvolatile memory devices D1 to D4, it is to be noted that the number of nonvolatile memory devices included in the storage medium 120 is not limited thereto.

Figure 3:
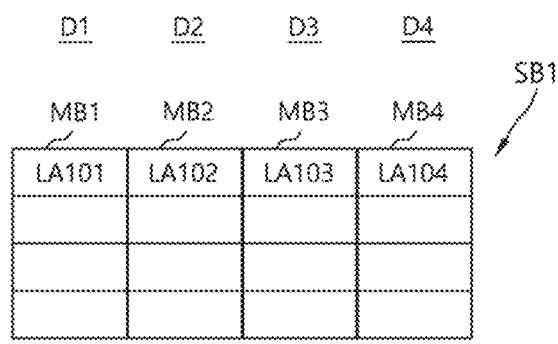
FIG. 3 is a schematic diagram illustrating a method in which a special super block is opened in accordance with the embodiment.

FIG. 3 is a schematic diagram illustrating a method in which a special super block SSB is opened in accordance with the embodiment.

Referring to FIG. 3, a super block SB1 may be configured by memory blocks MB1 to MB4 of the nonvolatile memory devices D1 to D4. When simply making descriptions by omitting units, each memory block may have a storage capacity of, for example, "8." Accordingly, the super block SB1 may have a storage capacity, that is, a super block size, of "32." In other words, in the example of FIG. 3, the super block SB1 has a storage capacity, that is four times the capacity of a single memory block.

It may be assumed that a logical address is allocated to, for example, each data size of "2," In this case, the super block size may correspond to 16 logical addresses at maximum. Therefore, when the super block SB1 is designated as a special super block, a logical address range mapped to the super block SB1 may be configured by 16 successive logical addresses.

Also, when the super block SB1 is designated as a special super block, a logical address range mapped to the super block SB1 may start from the start logical address of data to be initially written in the super block SB1. For example, when data corresponding to logical addresses LA101 to LA104 are initially written in the super block SB1 as shown, a logical address range mapped to the super block SB1 may be 16 successive logical addresses from the start logical address LA101 to a logical address LA116. Thereafter, the controller 110 may write only data corresponding to the logical addresses LA101 to LA116, in the super block SB1.

Meanwhile, in order to write-access the memory devices D1 to D4 in parallel, data corresponding to the logical addresses LA101 to LA104 may be written in the memory blocks MB1 to MB4 by being divided by a predetermined write unit. The write unit may correspond to, for example, one logical address. In FIG. 3, the data stored in the respective memory blocks MB1 to MB4 are shown as corresponding logical addresses.

The assumption in FIG. 3 will be applied as it is, in explaining a method for the controller 110 to manage and access super blocks. However, this is for an illustration purpose only, and it is to be noted that the embodiment is not limited thereto.

Figure 4:
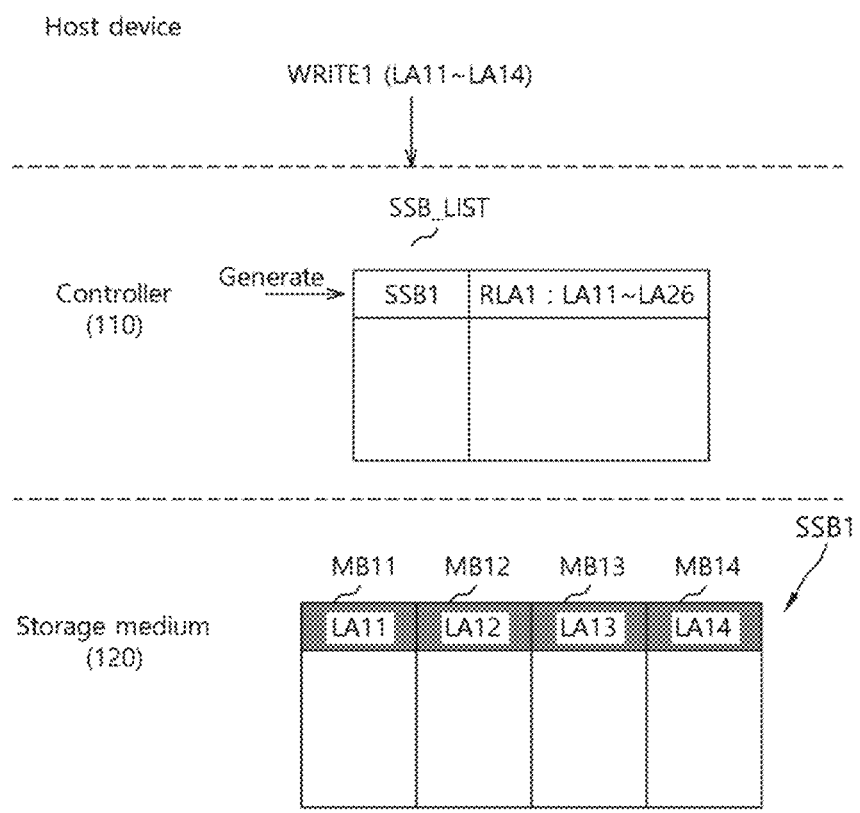
FIG. 4 is a schematic diagram illustrating a method for the controller to open a special super block.

FIG. 4 is a schematic diagram illustrating a method for the controller 110 of FIG. 1 to open a special super block SSB1.

Referring to FIG. 4, the controller 110 may receive a write request WRITE1 for the data of write-target logical addresses LA11 to LA14 from the host device. When assuming that there is no special super block which is currently opened, the controller 110 may open the new special super block SSB1 which is configured by memory blocks MB11 to MB14.

The controller 110 may map the special super block SSB1 to a logical address range RLA1. The logical address range RLA1 may be configured by 16 successive logical addresses LA11 to LA26 starting from the start logical address LA11 for the write-target logical addresses LA11 to LA14.

The controller 110 may generate an information on the special super block SSB1 and the logical address range RLA1, and may include the information in a special super block list SSB_LIST.

By write-accessing the memory blocks MB11 to MB14 in parallel, the controller 110 may write the data of the write-target logical addresses LA11 to LA14 in the special super block SSB1.

Figure 5:
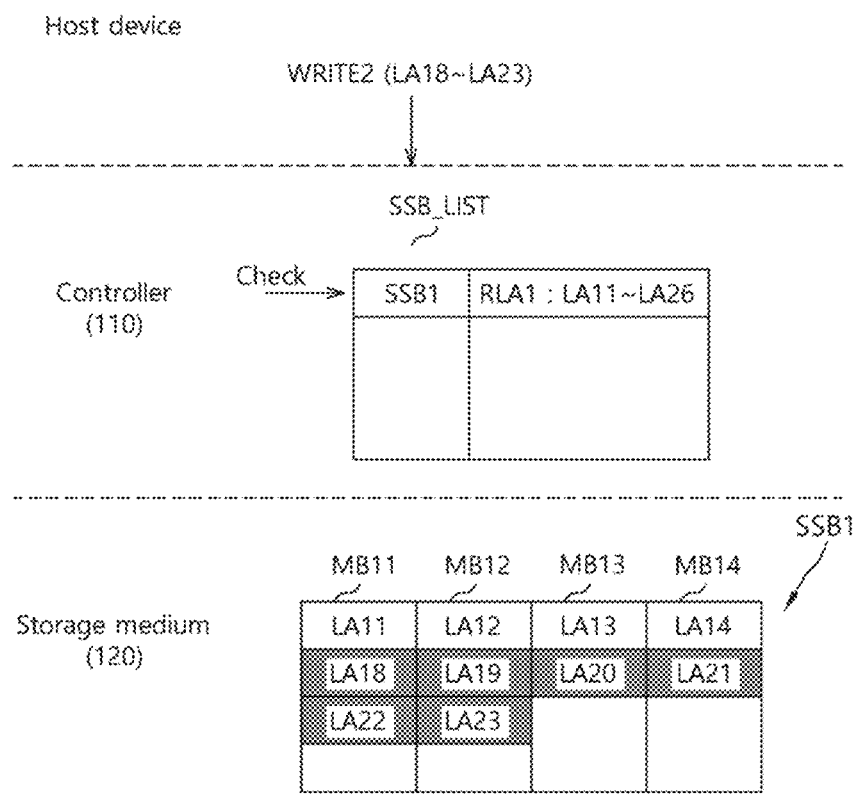
FIG. 5 is a schematic diagram illustrating a method for the controller to successively write data in the special super block.

FIG. 5 is a schematic diagram illustrating a method for the controller 110 of FIG. 1 to successively write data in the special super block SSB1.

Referring to FIG. 5, the controller 110 may receive a write request WRITE2 for the data of write-target logical addresses LA18 to LA23 from the host device.

The controller 110 may check the special super block list SSB_LIST and determine whether the data of the write-target logical addresses LA18 to LA23 can be written in the special super block SSB1. In detail, the controller 110 may determine whether the write-target logical addresses LA18 to LA23 are included in the logical address range RLA1 which is mapped to the special super block SSB1. When the write-target logical addresses LA18 to LA23 are included in the logical address range RLA1, the controller 110 determines that the data of the logical addresses LA18 to LA23 can be written in the special super block SSB1.

Therefore, by write-accessing the memory blocks MB11 to MB14 in parallel, the controller 110 may successively write the data of the write-target logical addresses LA18 to LA23 in the special super block SSB1.

Figure 6:
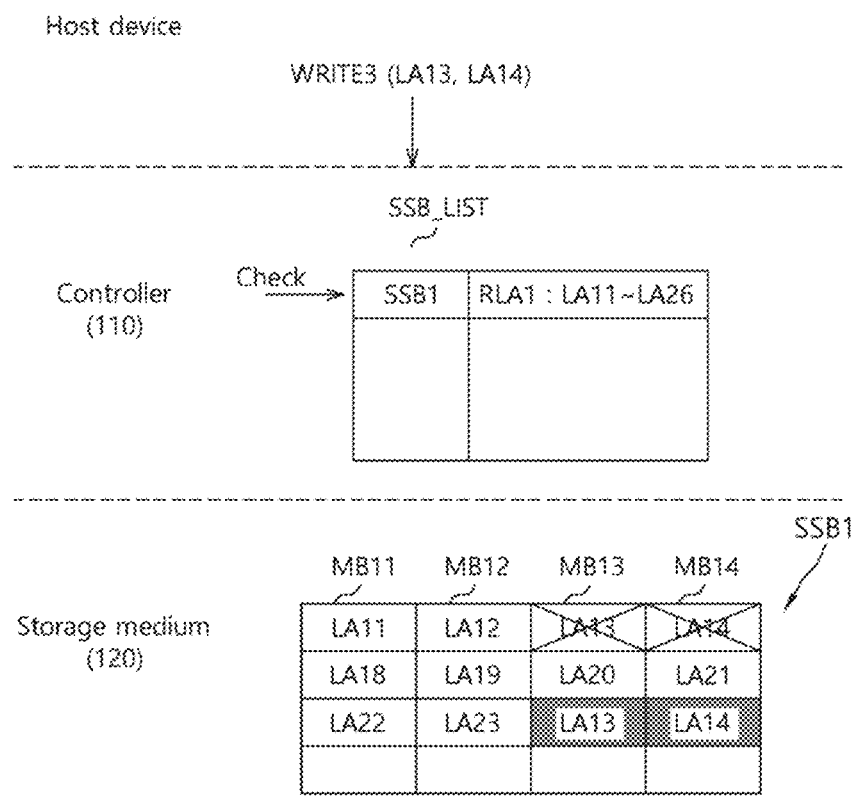
FIG. 6 is a schematic diagram illustrating a method for the controller to write data in the special super block and invalidate data of a previous version.

FIG. 6 is a schematic diagram illustrating a method for the controller 110 of FIG. 1 to write data in the special super block SSB1 and invalidate data of a previous version.

Referring to FIG. 6, the controller 110 may receive a write request WRITE3 for the data of write-target logical addresses LA13 and LA14 from the host device.

The controller 110 may check the special super block list SSB_LIST and determine whether the data of the write-target logical addresses LA13 and LA14 can be written in the special super block SSB1. Since the logical addresses LA13 and LA14 are included in the logical address range RLA1 which is mapped to the special super block SSB1, the controller 110 determines that the data of the write-target logical addresses LA13 and LA14 can be written in the special super block SSB1.

Therefore, by write-accessing the memory blocks MB13 and MB14 in parallel, the controller 110 writes the data of the write-target logical addresses LA13 and LA14 in the special super block SSB1. At this time, the previous data of the write-target logical addresses LA13 and LA14 stored in the special super block SSB1 will be invalidated. In FIG. 6, the invalidated data are marked by "X."

Figure 7:
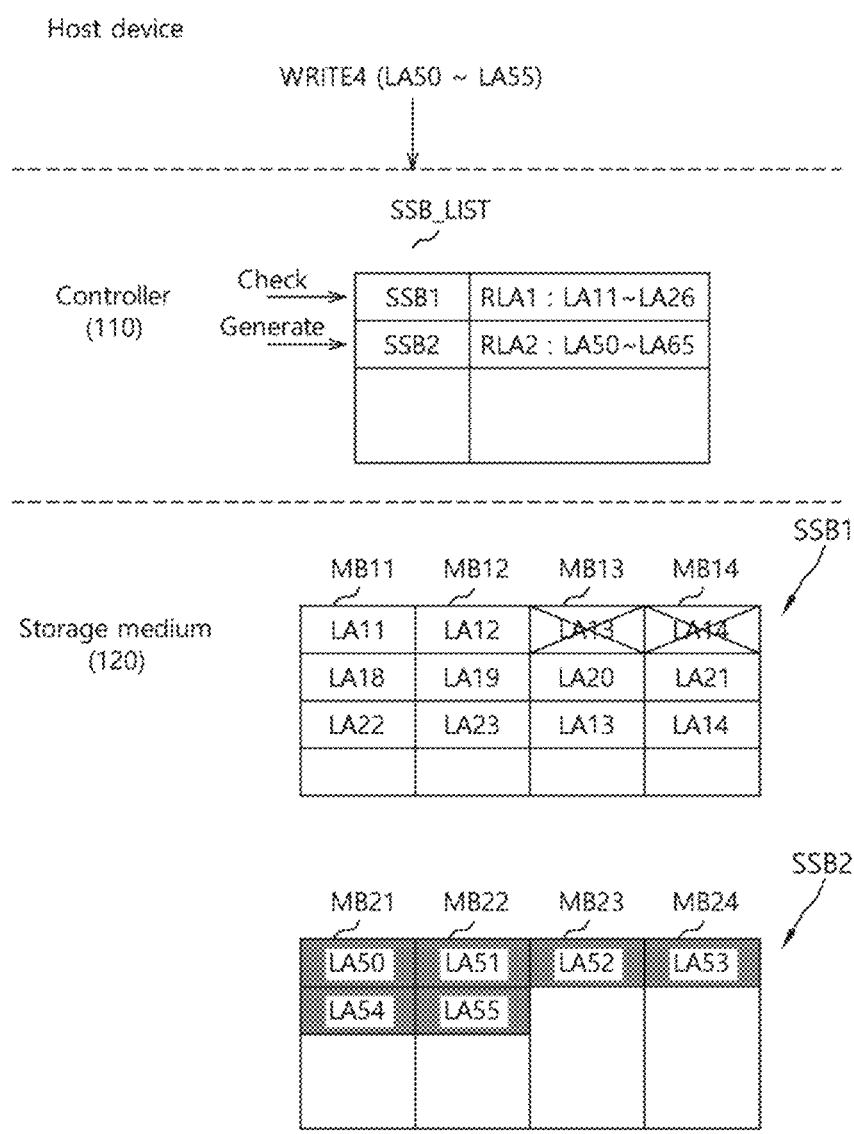
FIG. 7 is a schematic diagram illustrating of a method for the controller of FIG. 1 to open a new special super block.

FIG. 7 is a schematic representation of an example of a method for the controller 110 of FIG. 1 to open a new special super block SSB2.

Referring to FIG. 7, the controller 110 may receive a write request WRITE4 for the data of write-target logical addresses LA50 to LA55 from the host device.

The controller 110 may check the special super block list SSB_LIST and determine whether the data of the write-target logical addresses LA50 to LA55 can be written in the special super block SSB1. Since the write-target logical addresses LA50 to LA55 are not included in the logical address range RLA1 which is mapped to the special super block SSB1, the controller 110 determines that the data of the write-target logical addresses LA50 to LA55 cannot be written in the special super block SSB1.

Meanwhile, it is assumed that the reference number of special super blocks, which are allowed to be currently opened at the same time, is "2" at maximum. Thus, the controller 110 will open the new special super block SSB2 which is configured by memory blocks MB21 to MB24.

The controller 110 then maps the special super block SSB2 to a logical address range RLA2. The logical address range RLA2 may be configured by 16 successive logical addresses LA50 to LA65 starting from the start logical address LA50 for the write-target logical addresses LA50 to LA55.

The controller 110 may generate an information on the special super block SSB2 and the logical address range RLA2, and may include the information in the special super block list SSB_LIST.

By write-accessing the memory blocks MB21 to MB24 in parallel, the controller 110 may write the data of the write-target logical addresses LA50 to LA55 in the special super block SSB2.

Figure 8:
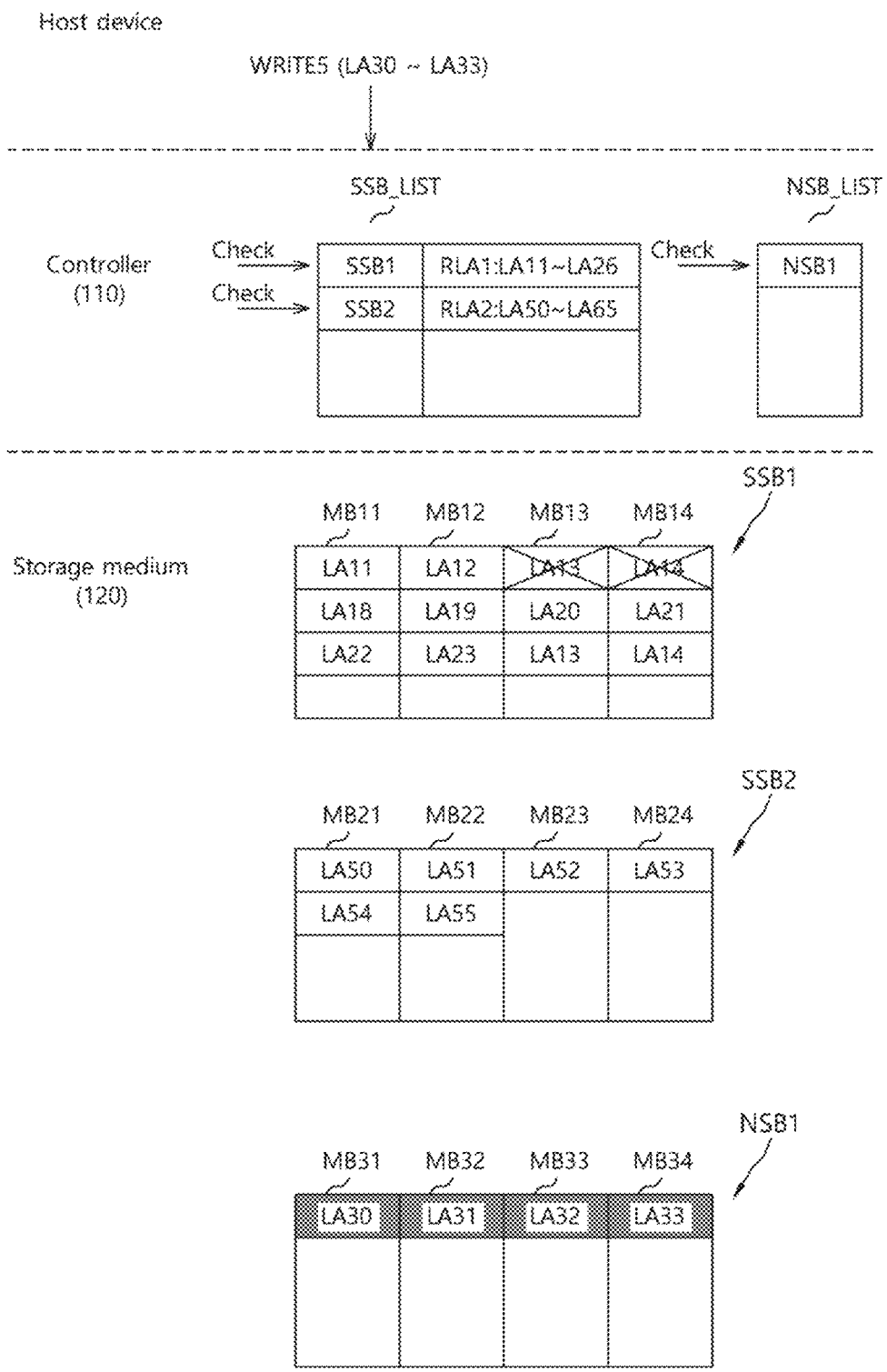
FIG. 8 is a schematic diagram a method for the controller to write data in a normal super block.

FIG. 8 is a schematic diagram illustrating a method for the controller 110 of FIG. 1 to write data in a normal super block NSB1.

Referring to FIG. 8, the controller 110 may receive a write request WRITE5 for the data of write-target logical addresses LA30 to LA33 from the host device.

The controller 110 may check the special super block list SSB_LIST and determine whether the data of the write-target logical addresses LA30 to LA33 can be written in the special super blocks SSB1 and SSB2. Since the write-target logical addresses LA30 to LA33 are not included in any one of the logical address ranges RLA1 and RLA2 which are mapped to the special super blocks SSB1 and SSB2, the controller 110 determines that the data of the write-target logical addresses LA30 to LA33 cannot be written in the special super blocks SSB1 and SSB2.

Assuming, as an example, that the reference number of special super blocks, which are allowed to be currently opened at the same time, is limited to "2" at maximum, the controller 110 cannot open a new special super block any more. Therefore, the controller 110 may check a normal super block list NSB_LIST and confirm that the normal super block NSB1 which is configured by memory blocks MB31 to MB34 is currently opened.

As a result, by write-accessing the memory blocks MB31 to MB34 in parallel, the controller 110 may write the data of the write-target logical addresses LA30 to LA33 in the normal super block NSB1. While it is illustrated in FIG. 8 that the data of the write-target logical addresses LA30 to LA33 are initially written in the normal super block NSB1, it is to be noted that the data of the write-target logical addresses LA30 to LA33 may be written in succession to the data already written in the normal super block NSB1.

The normal super block list NSB_LIST may include an information on one or more normal super blocks NSB which are currently opened.

Figure 9:
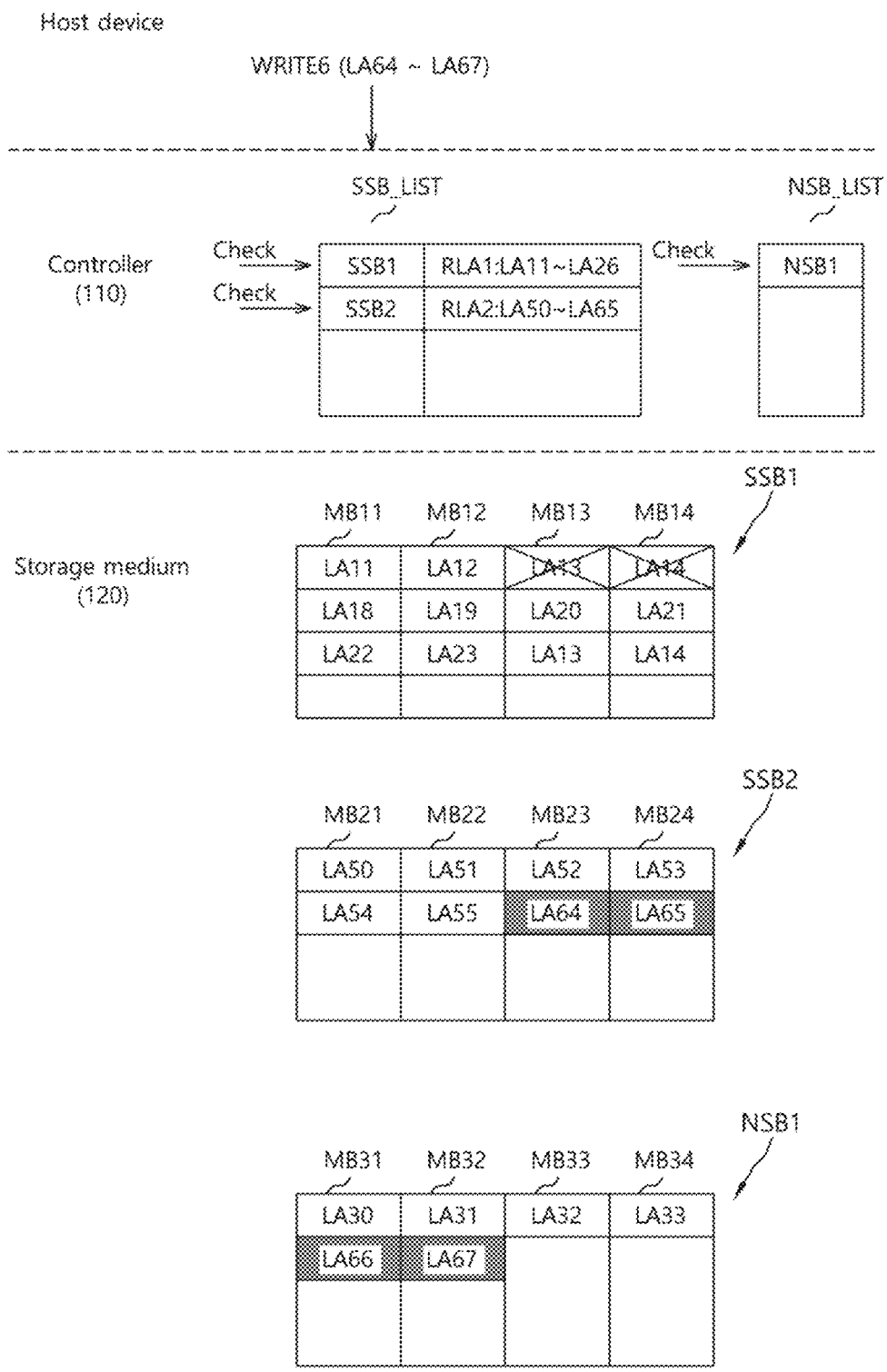
FIG. 9 is a schematic diagram illustrating a method for the controller to successively write data in the special super block and the normal super block.

FIG. 9 is a schematic diagram a method for the controller 110 of FIG. 1 to successively write data in the special super block SSB1 and the normal super block NSB1.

Referring to FIG. 9, the controller 110 may receive a write request WRITE6 for the data of write-target logical addresses LA64 to LA67 from the host device.

The controller 110 may check the special super block list SSB_LIST and determine whether the data of the write-target logical addresses LA64 to LA67 can be written in the special super blocks SSB1 and SSB2. Since the write-target logical addresses LA64 and LA65 are included in the logical address range RLA2 which is mapped to the special super block SSB2, the controller 110 may determine that the data of the write-target logical addresses LA64 and LA65 may be written in the special super block SSB2.

Therefore, by write-accessing the memory blocks MB23 and MB24 in parallel, the controller 110 may successively write the data of the write-target logical addresses LA64 and LA65 in the special super block SSB2.

Since the write-target logical addresses LA66 and LA67 are not included in the logical address ranges RLA1 and RLA2 which are mapped to the special super blocks SSB1 and SSB2, the controller 110 may determine that the data of the write-target logical addresses LA66 and LA67 cannot be written in the special super blocks SSB1 and SSB2.

Assuming, as an example, that the reference number of special super blocks, which are allowed to be currently opened at the same time, is limited to "2" at maximum, the controller 110 cannot open a new special super block any more. Therefore, the controller 110 may check the normal super block list NSB_LIST and confirm that the normal super block NSB1 which is configured by the memory blocks MB31 to MB34 is currently opened.

Therefore, by write-accessing the memory blocks MB31 and MB32 in parallel, the controller 110 may successively write the data of the write-target logical addresses LA66 and LA67 in the normal super block NSB1.

Figure 10:
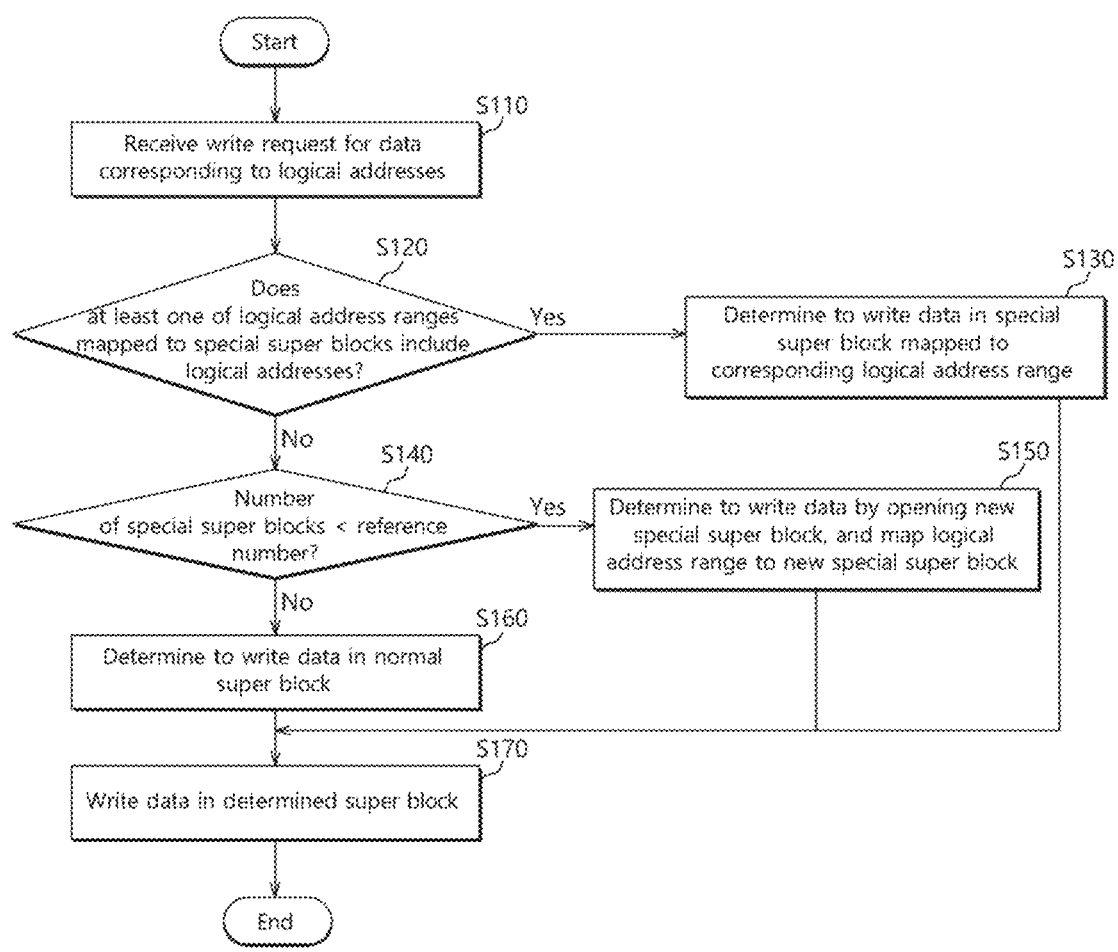
FIG. 10 is a flow chart illustrating an operating method of the controller in accordance with an embodiment.

FIG. 10 is a flow chart illustrating an operating method of the controller 110 shown in FIG. 1.

Referring to FIGS. 1 and 10, at step S110, the controller 110 may receive a write request from the host device, for data corresponding to one or more write-target logical addresses.

At step S120, the controller 110 may determine whether at least one logical address range among logical address ranges which are respectively mapped to currently opened special super blocks SSB includes the write-target logical addresses corresponding to the received data. That is, the controller 110 may determine whether it is possible to write the data in at least one of the currently opened special super blocks SSB. When at least one logical address range among the logical address ranges which are respectively mapped to the currently opened special super blocks SSB includes the write-target logical addresses of the data, the process may proceed to step S130. When not even one among the logical address ranges which are respectively mapped to the currently opened special super blocks SSB includes the write-target logical addresses of the data, the process proceeds to step S140.

At the step S130, the controller 110 may determine to write the data in a currently opened special super block mapped to a logical address range which includes the write-target logical addresses of the data.

At the step S140, the controller 110 determines whether the number of the currently opened special super blocks SSB is less than the reference number. When the number of the currently opened special super blocks SSB is less than the reference number, the process may proceed to step S150. When the number of the currently opened special super blocks SSB is equal to the reference number, the process may proceed to step S160.

At the step S150, the controller 110 may open a new special super block SSB, and may determine to write the data in the new special super block SSB. The controller 110 may map a logical address range to the new special super block SSB. The logical address range may be configured by successive logical addresses corresponding to a super block size, and the start logical address of the logical address range may be the start logical address of the write-target logical addresses.

At the step S160, the controller 110 may determine to write the data in one of the normal super blocks NSB.

At step S170, the controller 110 may write the data in the super block determined at the step S130, the step S150 or the step S160.

In summary, write-target logical addresses write-requested from a host device may represent the characteristic of locality. In other words, the host device may frequently transmit write requests with respect to specific data. Such hot data may cause a lot of invalid data because of the characteristics of a nonvolatile memory device which is impossible to overwrite. In this situation, according to the embodiment, in the case where hot data are included in a certain logical address range mapped to a special super block, the invalid data of the hot data may be concentrated in the corresponding super block. Therefore, the costs of a garbage collection operation and a wear leveling operation including operations of moving only the valid data of a super block to another super block and erasing the super block may be reduced.

Figure 11:
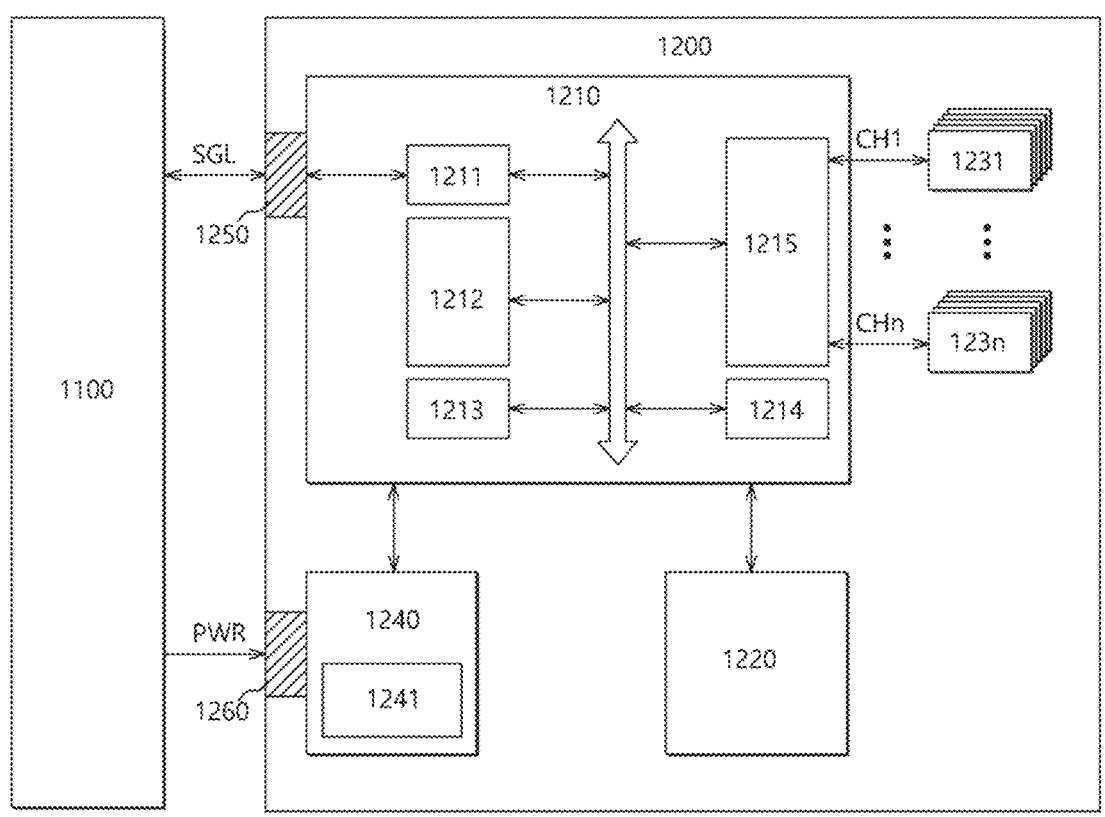
FIG. 11 is a diagram illustrating a data processing system including a solid-state drive (SSD) in accordance with an embodiment.

FIG. 11 is a diagram illustrating a data processing system 1000 including a solid state drive (SSD) 1200 in accordance with an embodiment. Referring to FIG. 11, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control the operation of the SSD 1200. The controller 1210 may be configured in the same manner as the controller 110 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 12:
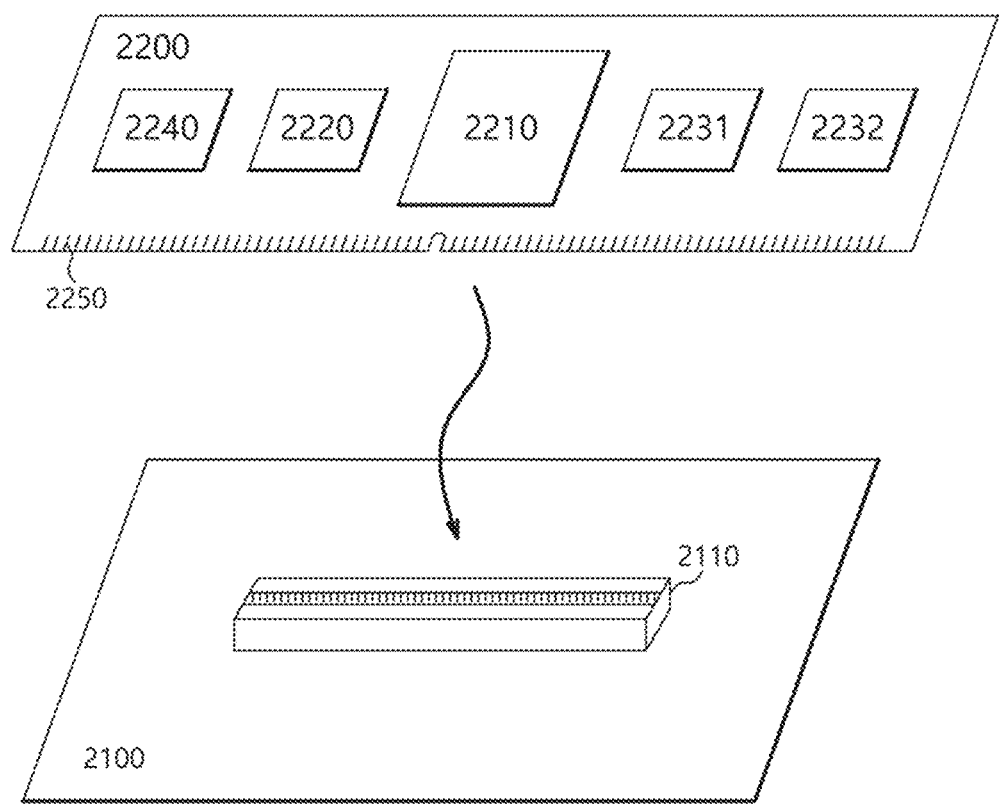
FIG. 12 is a diagram illustrating a data processing system including a memory system in accordance with an embodiment.

FIG. 12 is a diagram illustrating a data processing system 2000 including a memory system 2200 in accordance with an embodiment. Referring to FIG. 12, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control the operation of the memory system 2200. The controller 2210 may be configured in the same manner as the controller 1210 shown in FIG. 11.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 13:
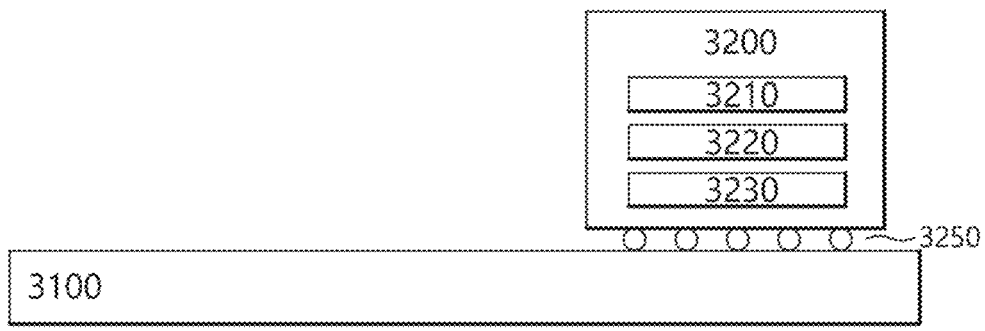
FIG. 13 is a diagram illustrating a data processing system including a memory system in accordance with an embodiment.

FIG. 13 is a diagram illustrating a data processing system 3000 including a memory system 3200 in accordance with an embodiment. Referring to FIG. 13, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control the operation of the memory system 3200. The controller 3210 may be configured in the same manner as the controller 1210 shown in FIG. 11.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 14:
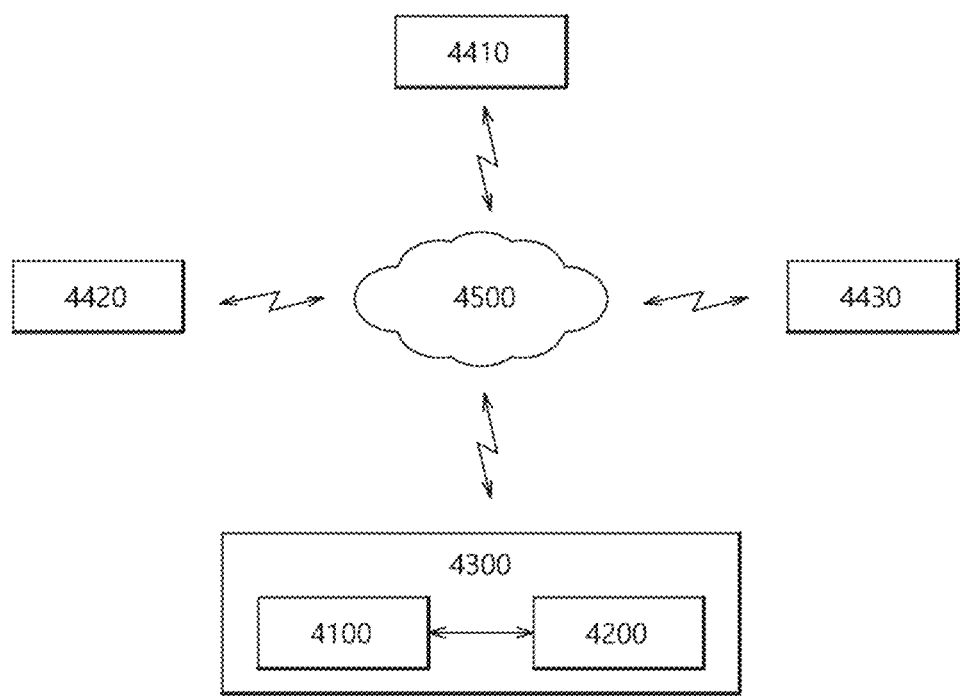
FIG. 14 is a diagram illustrating a network system including a memory system in accordance with an embodiment.

FIG. 14 is a diagram illustrating a network system 4000 including a memory system 4200 in accordance with an embodiment. Referring to FIG. 14, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 11, the memory system 2200 shown in FIG. 12 or the memory system 3200 shown in FIG. 13.

Figure 15:
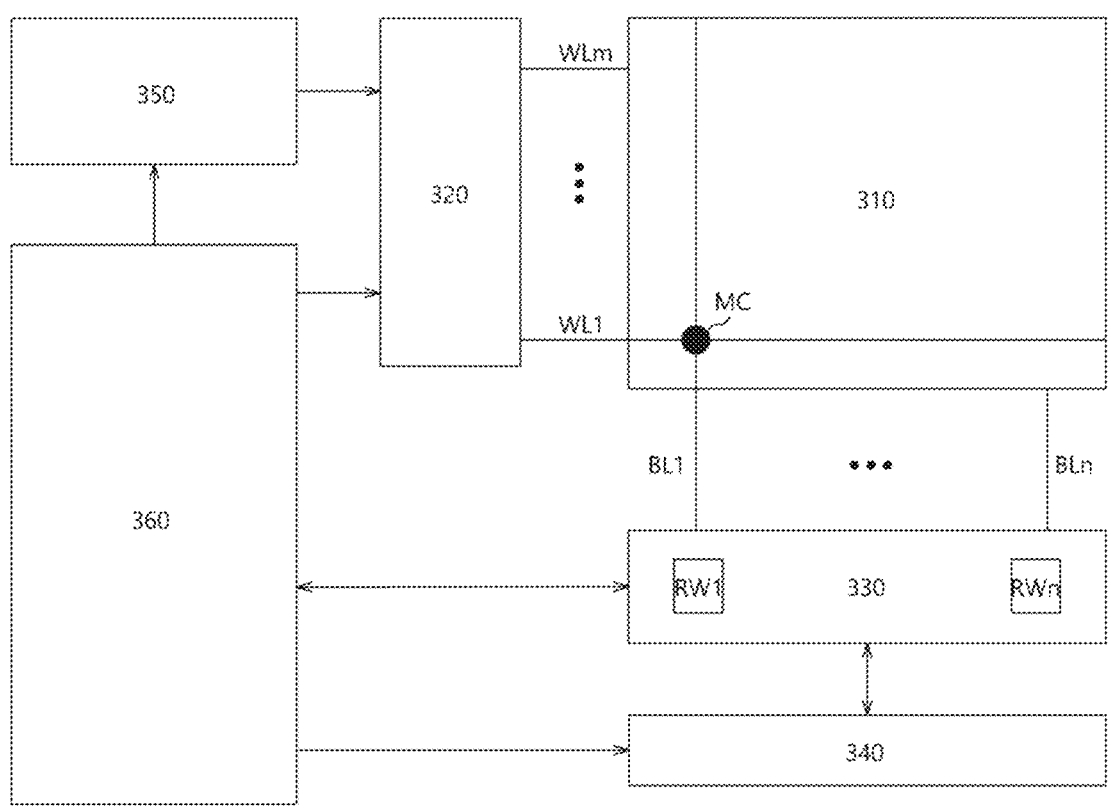
FIG. 15 is a block diagram illustrating a nonvolatile memory device included in a memory system in accordance with an embodiment.

FIG. 15 is a block diagram illustrating a nonvolatile memory device 300 included in a memory system in accordance with an embodiment. Referring to FIG. 15, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control the operation of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood by those skilled in the art that the embodiments described are examples only. Accordingly, the electronic device described herein should not be limited to the described embodiments only.

What is claimed is:

1. An electronic device comprising:
a controller; and
a non-transitory computer-readable storage medium configured to store operation codes for causing the controller to execute processes,
wherein the non-transitory computer-readable storage medium includes a plurality of memory blocks,
wherein the processes comprise:
grouping the plurality of memory blocks into a plurality of super blocks;
receiving a write request for data corresponding to one or more write-target logical addresses;
selecting a first super block which is empty and not mapped to any logical address range among the plurality of super blocks when any one among one or more logical address ranges which are respectively mapped to one or more second super blocks does not include the one or more write-target logical addresses, and initially writing the data in the first super block; and
mapping the first super block to a first logical address range in response to selection of the first super block, and
wherein the first logical address range is configured by successive addresses starting from a start logical address of the one or more write-target logical addresses, and
wherein the first logical address range corresponds to a super block size.

2. The electronic device according to claim 1, wherein the selecting of the first super block and the writing of the data comprises writing the data in the first super block by determining whether a number of the second super blocks is less than a reference number when any one among the logical address ranges does not include the one or more write-target logical addresses.

3. The electronic device according to claim 1, wherein the processes further comprise writing, when a second logical address range among the logical address ranges includes the one or more write-target logical addresses, the data in a second super block which is mapped to the second logical address range, among the second super blocks.

4. The electronic device according to claim 3, wherein the writing of the data in the second super block comprises writing the data in the second super block and invalidating, when previous data corresponding to the one or more logical addresses are written in the second super block, the previous data.

5. The electronic device according to claim 1, wherein the processes further comprise not selecting the first super block again when a reference time elapses from when the first super block is previously selected.

6. An electronic device comprising:
a controller; and
a non-transitory computer-readable storage medium configured to store operation codes for causing the controller to execute processes,
wherein the non-transitory computer-readable storage medium includes a plurality of memory blocks, and
wherein the processes comprise:
grouping the plurality of memory blocks into a plurality of super blocks;
writing first write-requested data in one or more first super blocks which are empty and not mapped to any logical address range in response to one or more write requests;
mapping the first super blocks to one or more logical address ranges in response to the one or more write requests, respectively; and
writing second write-requested data in at least one super block among the first super blocks in response to a second write request when a logical address range mapped to the at least one super block includes one or more write-target logical addresses corresponding to the second write-requested data,
wherein each of the logical address ranges starts from a start logical address of first write-requested data initially written in a super block mapped to each of the logical address ranges.

7. The electronic device according to claim 6, wherein each of the logical address ranges corresponds to a super block size.

8. The electronic device according to claim 6, wherein the writing of the second write-requested data in the super block comprises writing the second write-requested data in the super block and invalidating, when previous data corresponding to the one or more write-target logical addresses are written in the super block, the previous data.

9. The electronic device according to claim 6, wherein the mapping of the first super blocks comprises mapping the first super blocks to the logical address ranges, respectively, when selecting the first super blocks to use them, and generating a list including an information on the first super blocks and the logical address ranges.

10. The electronic device according to claim 6, wherein the processes comprise selecting a second super block among the plurality of super blocks and writing the second write-requested data in the second super block, when any one among the logical address ranges does not include the one or more write-target logical addresses.

11. The electronic device according to claim 10, wherein the processes comprise:

mapping the second super block to a second logical address range when selecting the second super block, and wherein the second logical address range is configured by successive addresses starting from a start logical address of the one or more write-target logical addresses, and wherein the second logical address range corresponds to a super block size.

12. The electronic device according to claim 10, wherein the writing of the second write-requested data in the second super block comprises writing the second write-requested data in the second super block by determining whether a number of the first super blocks is less than a reference number when any one among the logical address ranges does not include the one or more write-target logical addresses.

13. The electronic device according to claim 10, wherein the processes further comprise not selecting the second super block again when a reference time elapses from when the second super block is previously selected.

14. A memory system comprising:
a memory device including a plurality of super blocks; and a controller configured to:

control the memory device to write data into one among currently opened super blocks according to one or more write-target logical addresses falling within logical address ranges respectively mapped to the currently opened super blocks; and open another super block from the super blocks in response to a write request for the write-target logical addresses, map another logical address range to the another newly opened super block and control the memory device to write data into the another newly opened super block according to one or more among write-target logical addresses out of the logical address ranges respectively mapped to the currently opened super blocks, wherein the logical address range is a group of consecutive logical addresses, and wherein a start logical address of the another logical address range is a start logical address of the write-target logical addresses out of the logical address ranges respectively mapped to the currently opened super blocks.

* * * * *